(12) United States Patent
Hong

(10) Patent No.: US 6,799,535 B2
(45) Date of Patent: Oct. 5, 2004

(54) METHOD AND SYSTEM FOR MEASURING MOBILITY OF A TESTED ANIMAL

(76) Inventor: Chen-Jee Hong, No. 201, Sec. 2, Shih-Pai Rd., Taipei City (TW)

( * ) Notice: Subject to any disclaimer, the term of this patent is extended or adjusted under 35 U.S.C. 154(b) by 150 days.

(21) Appl. No.: 10/408,177

(22) Filed: Apr. 4, 2003

(65) Prior Publication Data

US 2003/0196607 A1 Oct. 23, 2003

(30) Foreign Application Priority Data

Apr. 19, 2002 (TW) .......................................... 91108088 A

(51) Int. Cl.[7] .............................................. A01K 1/03
(52) U.S. Cl. ......................................................... 119/421
(58) Field of Search ................................ 119/174, 417, 119/421, 452, 908

(56) References Cited

U.S. PATENT DOCUMENTS 5,608,209 A * 3/1997 Matsuda ...................... 119/421
5,717,202 A * 2/1998 Matsuda ...................... 119/421
6,062,224 A * 5/2000 Kissinger et al. ........... 119/421
6,273,026 B1 * 8/2001 Ferster et al. ............... 119/421

* cited by examiner

Primary Examiner—Charles T. Jordan
Assistant Examiner—Elizabeth Shaw
(74) Attorney, Agent, or Firm—Christensen O'Connor; Johnson Kindness PLLC

(57) ABSTRACT

In a method and system for measuring mobility of a tested animal, a lower float portion of a float member floats on a liquid body disposed in a container. An upper detected portion of the float member vertically opposite to the lower float portion is disposed above the liquid body. The tested animal is placed in the liquid body such that movement of the tested animal in the liquid body results in surface waves of the liquid body and that the upper, detected portion moves according to the surface waves reaching the lower float portion. Positions of the upper detected portion are optically detected during a time period. Position information of the tested animal in the liquid body is then determined from the detected positions.

19 Claims, 4 Drawing Sheets

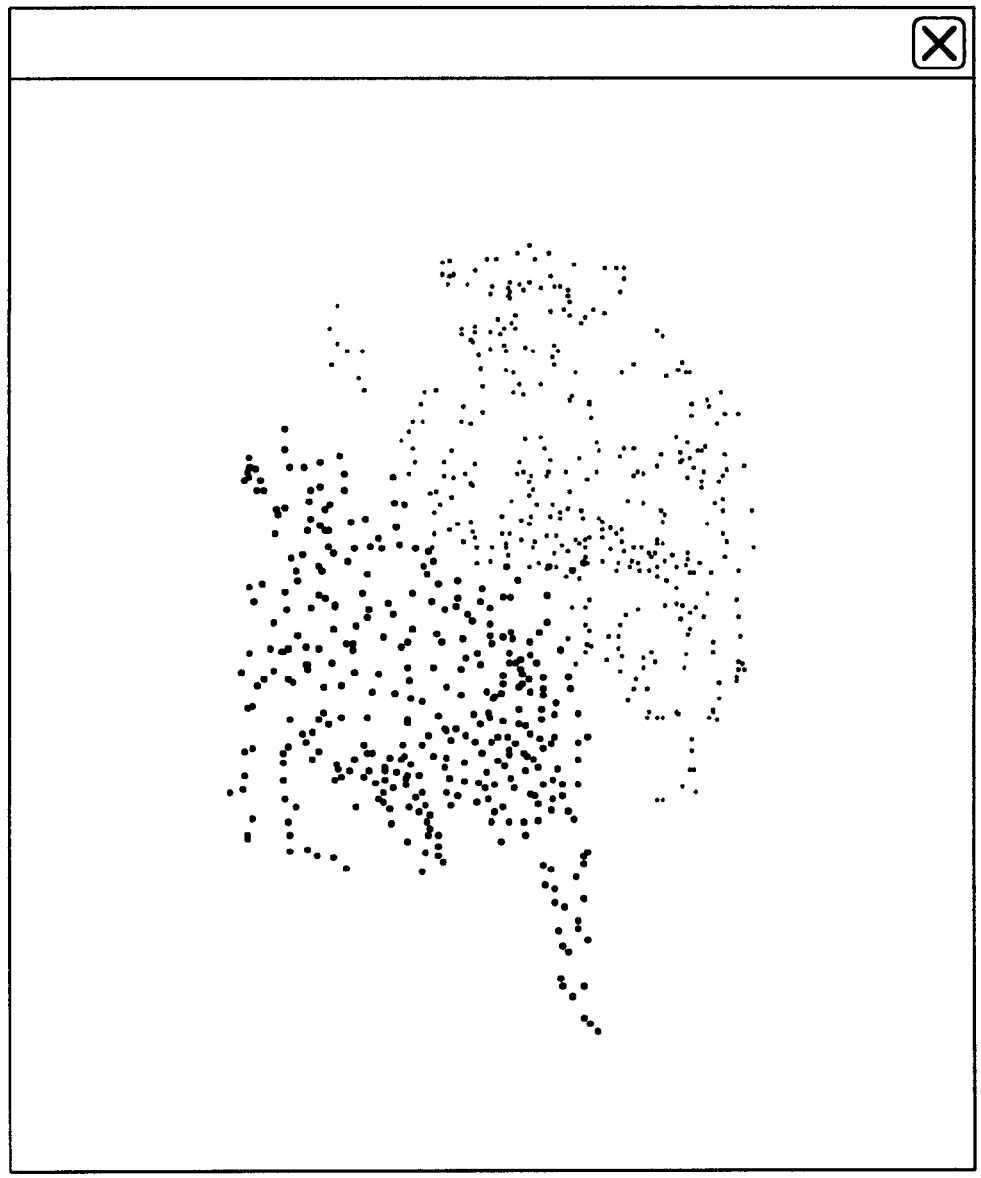
F I G. 5

US 6,799,535 B2

METHOD AND SYSTEM FOR MEASURING MOBILITY OF A TESTED ANIMAL

CROSS-REFERENCE TO RELATED APPLICATION

This application claims priority of Taiwanese Application No. 091108088, filed on Apr. 19, 2002.

BACKGROUND OF THE INVENTION

1. Field of the Invention

The invention relates to a measuring system, more particularly to a method and apparatus for measuring mobility of a tested animal.

2. Description of the Related Art

A measurement result from the forced swimming test for a tested animal, such as a mouse, is usually used as reference for evaluating whether the tested animal has symptoms of depression.

FIG. 1 illustrates an automated system for measuring mobility of a tested mouse 97 in the forced swimming test. The system includes a cylindrical container 91, a liquid body 96 disposed in the container 91, a sensor unit 92, a counter unit 93, a printer 95, and a control unit 94 coupled electrically to the sensor 92, the counter unit 93 and the printer 95. Initially, the tested mouse 97 is placed in the liquid body 96 around an electromagnetic field with a predetermined frequency. Movement of the tested mouse 97 in the liquid body 96 will result in variations in the frequency of the electromagnetic field relative to the predetermined frequency. As such, the control unit 94 transforms frequency variations sensed by the sensor unit 92 into voltage changes expressed as impulses for receipt by the counter unit 93. The printer 95 prints the result measured by the system.

The sensor unit 92, the counter unit 93, the control unit 94 and the printer 95 are needed in the system, thereby resulting in a relatively high cost. Moreover, the measurement result, i.e., the times of mobility of the tested mouse 97, cannot be relied upon as reference for other analyses.

SUMMARY OF THE INVENTION

Therefore, the object of the present invention is to provide a relatively low cost method and apparatus for measuring mobility of a tested animal.

According to one aspect of the present invention, there is provided a method for measuring mobility of a tested animal. The method comprises the steps of:

a) providing a liquid body;

b) providing a float member having a lower float portion that floats on the liquid body, and an upper detected portion that is vertically opposite to the lower float portion and that is disposed above the liquid body;

c) placing the tested animal in the liquid body such that movement of the tested animal in the liquid body results in surface waves of the liquid body and that the upper detected portion of the float member moves according to the surface waves that reach the lower float portion of the float member;

d) optically detecting positions of the upper detected portion of the float member during a time period; and e) determining position information of the tested animal in the liquid body from the positions detected in step d).

According to another aspect of the present invention, there is provided a system for measuring mobility of a tested animal. The system comprises:

a container;

a liquid body disposed in the container;

a float member having a lower float portion that floats on the liquid body, and an upper detected portion that is vertically opposite to the lower float portion and that is disposed above the liquid body, the upper detected portion of the float member moving according to surface waves of the liquid body that result from movement of the tested animal in the liquid body when the tested animal is placed in the liquid body and that reach the lower float portion of the float member;

a sensor unit for optically detecting positions of the upper detected portion of the float member during a time period; and a computing unit, coupled to the sensor unit, for determining position information of the tested animal in the liquid body from the positions detected by the sensor unit.

BRIEF DESCRIPTION OF THE DRAWINGS

Other features and advantages of the present invention will become apparent in the following detailed description of the preferred embodiment with reference to the accompanying drawings, of which:

FIG. 5 is a distribution plot of position information of the tested animal shown on a monitor of the preferred embodiment.

DETAILED DESCRIPTION OF THE PREFERRED EMBODIMENT

Figure 1:
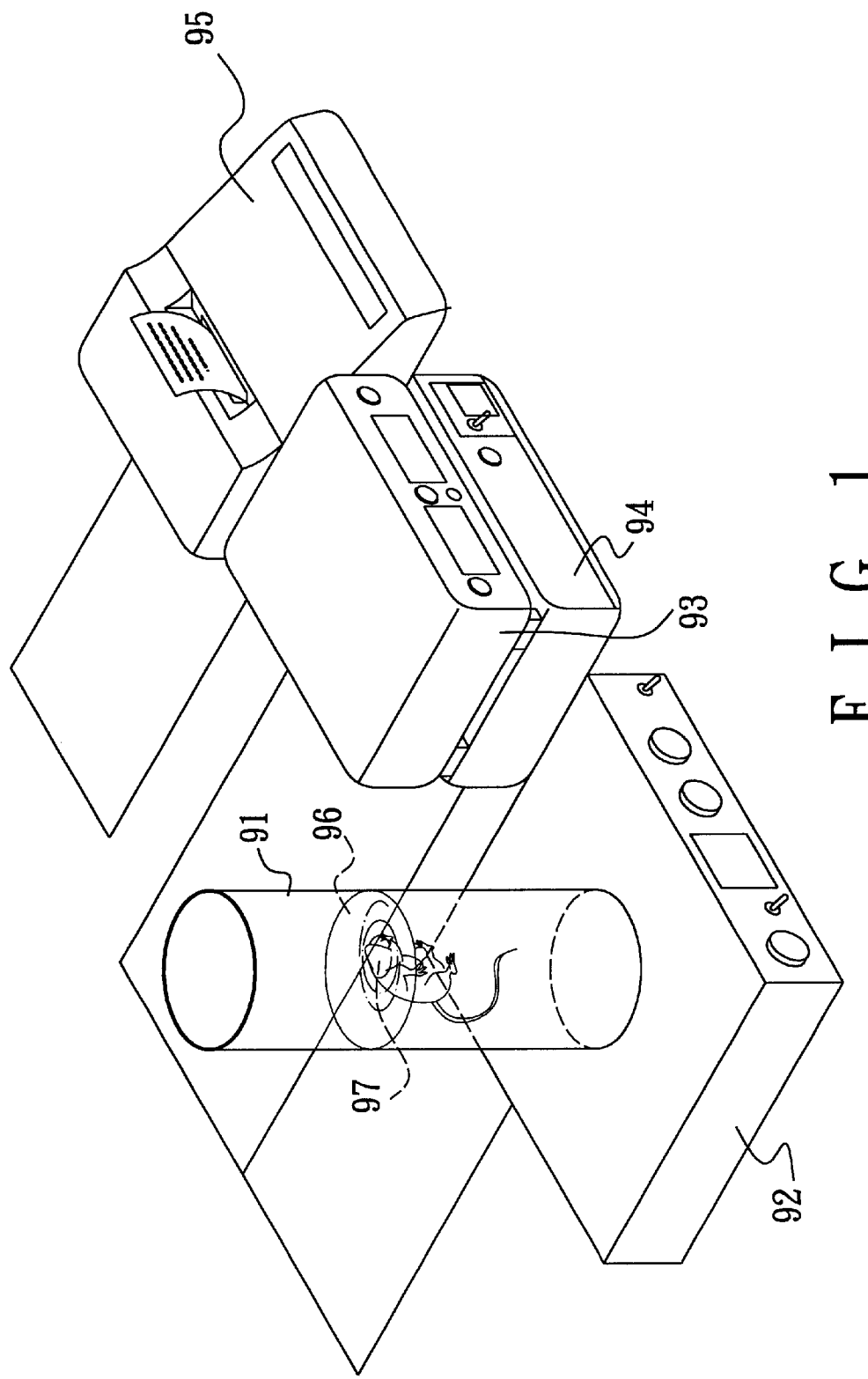
FIG. 1 illustrates a conventional system for measuring mobility of a tested animal.
Figure 2:
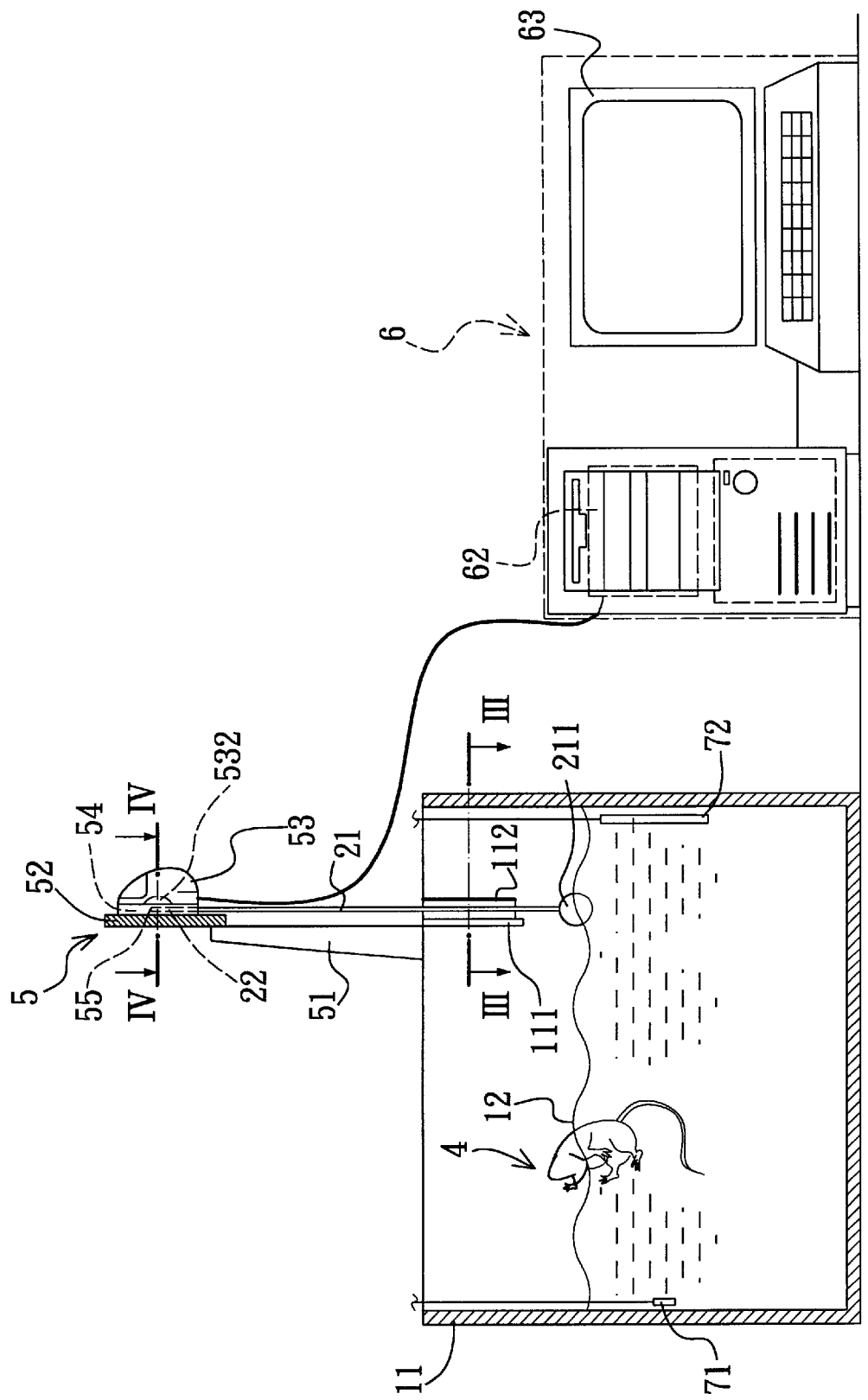
FIG. 2 is a schematic view showing the preferred embodiment of a system for measuring mobility of a tested animal according to the present invention.

Referring to FIG. 2, the preferred embodiment of a system for measuring mobility of a tested animal 4 according to the present invention is shown to include a container 11, a liquid body 12, a float member 21, a sensor unit 5, and a computing unit 6. In this embodiment, the tested animal 4 is a mouse. The mobility result for the tested animal 4 measured by the system can be used as reference for evaluating melancholia or can be used for other purposes.

The container 11 is cylindrical in shape. The liquid body 12, such as water, is disposed in the container 11.

Figure 3:
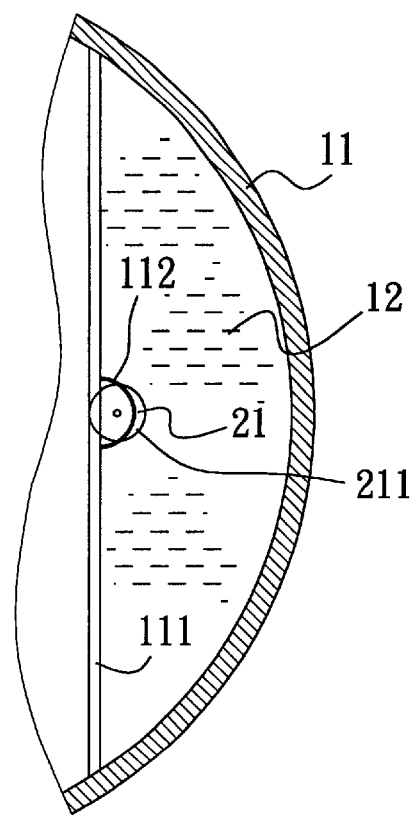
FIG. 3 is a fragmentary schematic sectional view taken along line III—III in FIG. 2.

The float member 21 has a lower float portion 211 in the shape of a ball that floats on the liquid body 12, and an upper detected portion 22 that is vertically opposite to the lower float portion 211 and that is disposed above the liquid body 12. The upper detected portion 22 of the float member 21 moves according to surface waves of the liquid body 12 that result from movement of the tested animal 4 in the liquid body 12 when the tested animal 4 is placed in the liquid body 12 and that reach the lower float portion 211 of the float member 21. In addition, the container 11 is formed with a barrier 111 disposed above a surface of the liquid body 12 to prevent the tested animal 4 in the liquid body 12 from reaching the lower float portion 211 of the float member 21, as best shown in FIG. 2. The barrier 111 is formed with a semicircular guide member 112 to restrict movement of the float member 21 on the liquid body 12 such that range of movement of the upper detected portion 22 is limited to within a predetermined area, as best shown in FIG. 3.

Figure 4:
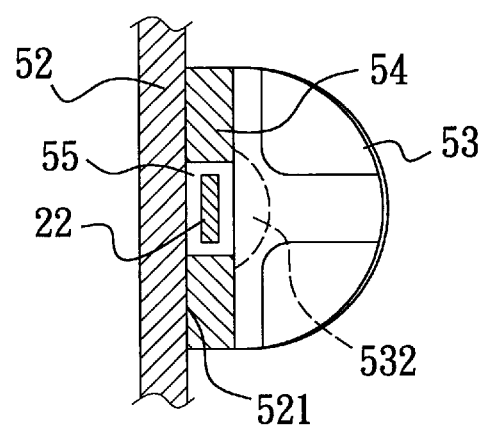
FIG. 4 is a fragmentary schematic sectional view taken along line IV—IV in FIG. 2.

The sensor unit 5 optically detects positions of the upper detected portion 22 of the float member 21 during a time period. The upper detected portion 22 of the float member 21 is movably confined within a sensing region 55 of the sensor unit 5 (see FIG. 4). The sensor unit 5 includes a conventional optical mouse 53 that has a light emitter 532 projecting light into the sensing region 55 and that receives light reflected by the upper detected portion 22 in the sensing region 55. In this embodiment, the sensor unit 5 further includes a base plate 52, and a spacer 54 that interconnects the base plate 52 and the optical mouse 53. The sensing region 55 is cooperatively confined by the base plate 52 mounted on the container 11 by means of a frame 51, the optical mouse 53 and the spacer 54, as best shown in FIG. 4.

The computing unit 6 is coupled to the sensor unit 5 and determines position information of the tested animal 4 in the liquid body 12 from the positions detected by the sensor unit 5. The position information includes a plurality of two-dimensional coordinate data. In this embodiment, the computing unit 6, such as a personal computer, includes a monitor 63 for displaying the position information thereon (see FIG. 5), and a data storage medium 62 for storing the position information therein. Therefore, according to the position information, mobility velocity of the tested animal 4 during the time period can be obtained.

The system further includes a temperature sensor 71 and a heating unit 72 (see FIG. 2). The temperature sensor 71 is disposed in the liquid body 12, is coupled to the computing unit 6, and senses temperature of the liquid body 12 in the container 11 so as to generate an output signal associated with the temperature of the liquid body 12 that is provided to the computing unit 6. The heating unit 72 is disposed in the liquid body 12 and is coupled to the computing unit 6. The computing unit 6 controls the heating unit 72 to supply heat to the liquid body 12 in the container 11 according to the output signal from the temperature sensor 71 so as to control the temperature of the liquid body 12 in the container 11 within a predetermined temperature range suitable for the tested animal 4. In this embodiment, the predetermined temperature range is 25–28° C.

It is noted that, due to the use of a personal computer and an optical mouse, the system of the present invention can easily achieve measurement for mobility of a tested animal at a relatively low cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for measuring mobility of a tested animal, comprising the steps of:
    a) providing a liquid body;
    b) providing a float member having a lower float portion that floats on the liquid body, and an upper detected portion that is vertically opposite to the lower float portion and that is disposed above the liquid body;
    c) placing the tested animal in the liquid body such that movement of the tested animal in the liquid body results in surface waves of the liquid body and that the upper detected portion of the float member moves according to the surface waves that reach the lower float portion of the float member;
    d) optically detecting positions of the upper detected portion of the float member during a time period; and
    e) determining position information of the tested animal in the liquid body from the positions detected in step d).

2. The method as claimed in claim 1, further comprising the step of providing a barrier, which is disposed above a surface of the liquid body, to prevent the tested animal in the liquid body from reaching the lower float portion of the float member.

3. The method as claimed in claim 1, wherein movement of the float member on the liquid body is restricted such that range of movement of the upper detected portion is limited to within a predetermined area.

4. The method as claimed in claim 1, wherein the upper detected portion of the float member is movably confined within a sensing region, and step d) includes projecting light into the sensing region, and receiving light reflected by the upper detected portion in the sensing region.

5. The method as claimed in claim 4, wherein step d) is conducted using an optical mouse.

6. The method as claimed in claim 5, wherein the sensing region is cooperatively confined by a base plate, the optical mouse, and a spacer that interconnects the base plate and the optical mouse.

7. The method as claimed in claim 1, wherein the position information includes a plurality of two-dimensional coordinate data.

8. The method as claimed in claim 1, further comprising the step of displaying the position information on a monitor.

9. The method as claimed in claim 1, further comprising the step of storing the position information in a data storage medium.

10. A system for measuring mobility of a tested animal, comprising:
    a container;
    a liquid body disposed in said container;
    a float member having a lower float portion that floats on said liquid body, and an upper detected portion that is vertically opposite to said lower float portion and that is disposed above said liquid body, said upper detected portion of said float member moving according to surface waves of said liquid body that result from movement of the tested animal in said liquid body when the tested animal is placed in said liquid body and that reach said lower float portion of said float member;
    a sensor unit for optically detecting positions of said upper detected portion of said float member during a time period; and
    a computing unit, coupled to said sensor unit, for determining position information of the tested animal in said liquid body from the positions detected by said sensor unit.

11. The system as claimed in claim 10, wherein said container is formed with a barrier disposed above a surface of said liquid body to prevent the tested animal in said liquid body from reaching said lower float portion of said float member.

12. The system as claimed in claim 11, wherein said barrier is formed with a guide member to restrict movement of said float member on said liquid body such that range of movement of said upper detected portion is limited to within a predetermined area.

13. The system as claimed in claim 12, wherein said upper detected portion of said float member is movably confined within a sensing region of said sensor unit, said sensor unit projecting light into said sensing region, and receiving light reflected by said upper detected portion in said sensing region.

14. The system as claimed in claim 13, wherein said sensor unit includes an optical mouse.

15. The system as claimed in claim 14, wherein said sensor unit further includes a base plate and a spacer that interconnects said base plate and said optical mouse, said sensing region being cooperatively confined by said base plate, said optical mouse, and said spacer.

16. The system as claimed in claim 10, wherein the position information includes a plurality of two-dimensional coordinate data.

17. The system as claimed in claim 10, wherein said computing unit includes a monitor for displaying the position information thereon.

18. The system as claimed in claim 10, wherein said computing unit includes a data storage medium for storing the position information therein.

19. The system as claimed in claim 10, further comprising a temperature sensor disposed in said liquid body and coupled to said computing unit, said temperature sensor sensing temperature of said liquid body in said container and generating an output signal associated with the temperature of said liquid body that is provided to said computing unit, and a heating unit disposed in said liquid body and coupled to said computing unit, said computing unit controlling said heating unit to supply heat to said liquid body in said container according to the output signal from said temperature sensor so as to control the temperature of said liquid body in said container within a predetermined temperature range suitable for the tested animal.

* * * * *